US012665487B2

(12) United States Patent
Li et al.

(10) Patent No.: US 12,665,487 B2
(45) Date of Patent: Jun. 23, 2026

(54) SWITCHING CONVERTER WITH IMPROVED LIGHT LOAD EFFICIENCY AND CONTROL METHOD THEREOF

(71) Applicant: Chengdu Monolithic Power Systems Co., Ltd., Chengdu (CN)

(72) Inventors: Guangzhuo Li, Hangzhou (CN); Pengfei Liu, Hangzhou (CN)

(73) Assignee: Chengdu Monolithic Power Systems Co., Ltd., Chengdu (CN)

( * ) Notice: Subject to any disclaimer, the term of this patent is extended or adjusted under 35 U.S.C. 154(b) by 260 days.

(21) Appl. No.: 18/633,956

(22) Filed: Apr. 12, 2024

(65) Prior Publication Data

US 2024/0348147 A1 Oct. 17, 2024

(30) Foreign Application Priority Data

Apr. 14, 2023 (CN) .......................... 202310398063.6

(51) Int. Cl.
H02M 1/08 (2006.01)
H02M 1/00 (2006.01)
(52) U.S. Cl.
CPC ........... H02M 1/08 (2013.01); H02M 1/0025 (2021.05); H02M 1/0032 (2021.05)
(58) Field of Classification Search
CPC ..... H02M 1/08; H02M 1/0032; H02M 1/0025
See application file for complete search history.

(56) References Cited

U.S. PATENT DOCUMENTS

| | | | |
|---|---|---|---|
| 8,274,801 B2 | 9/2012 | Shi et al. | |
| 8,391,030 B2 | 3/2013 | Li et al. | |
| 9,893,635 B2 | 2/2018 | Lin | |
| 9,967,945 B2 * | 5/2018 | Chen | H05B 45/50 |
| 10,425,013 B2 | 9/2019 | Ouyang | |
| 10,826,380 B2 * | 11/2020 | Zhang | H02M 1/08 |
| 11,277,071 B2 | 3/2022 | Jin et al. | |
| 11,770,069 B2 * | 9/2023 | Liu | H02M 3/01 |
| | | | 363/21.02 |
| 11,996,778 B2 * | 5/2024 | Li | H02M 3/33515 |

* cited by examiner

*Primary Examiner* — Adolf D Berhane
(74) *Attorney, Agent, or Firm* — Perkins Coie LLP

(57) ABSTRACT

A controller for a switching converter converting an AC input voltage into an output voltage. The controller includes a light load determining circuit, a voltage comparing circuit, a window generator and a switch control circuit. The light load determining circuit generates a light load determining signal indicating whether the switching converter operates in a light load mode. The voltage comparing circuit compares a first feedback voltage signal indicative of the output voltage with a first and a second reference voltage signals respectively to generate a first square wave signal. The window generator generates a second square wave signal based on a second feedback voltage signal indicative of the AC input voltage. The switch control circuit generates a switch control signal to control the power operation of the switching converter based on the light load determining signal, the first square wave signal and the second square wave signal.

20 Claims, 7 Drawing Sheets

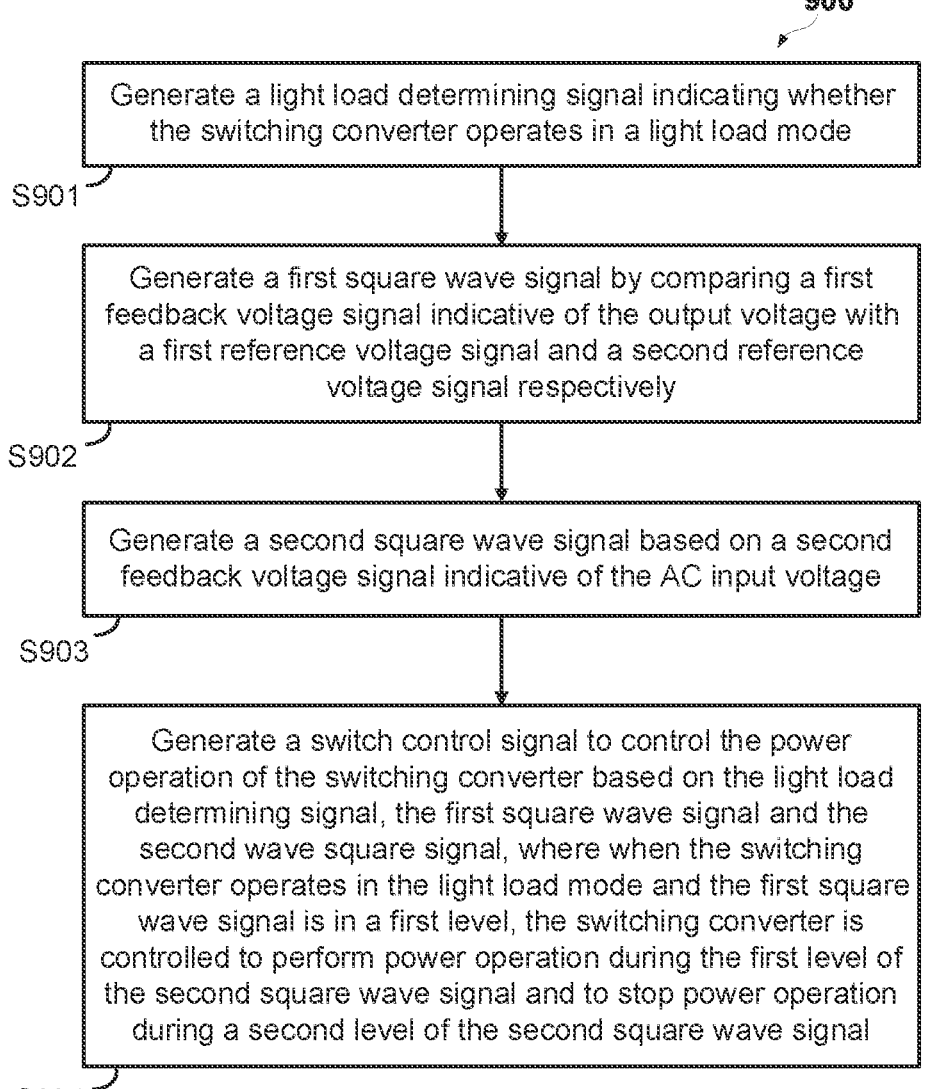

900

Generate a light load determining signal indicating whether the switching converter operates in a light load mode

S901

Generate a first square wave signal by comparing a first feedback voltage signal indicative of the output voltage with a first reference voltage signal and a second reference voltage signal respectively

S902

Generate a second square wave signal based on a second feedback voltage signal indicative of the AC input voltage

S903

Generate a switch control signal to control the power operation of the switching converter based on the light load determining signal, the first square wave signal and the second wave square signal, where when the switching converter operates in the light load mode and the first square wave signal is in a first level, the switching converter is controlled to perform power operation during the first level of the second square wave signal and to stop power operation during a second level of the second square wave signal

SWITCHING CONVERTER WITH IMPROVED LIGHT LOAD EFFICIENCY AND CONTROL METHOD THEREOF

CROSS-REFERENCE TO RELATED APPLICATIONS

This application claims the benefit of CN application Ser. No. 202310398063.6, filed on Apr. 14, 2023, and incorporated herein by reference.

TECHNICAL FIELD OF THE INVENTION

The present invention generally relates to electronic circuits, and more particularly but not exclusively, to switching converters and associated control methods.

BACKGROUND OF THE INVENTION

With the development of electronic technology, various electronic devices such as TVs, desktops, laptops and mobile phones are widely used. Many electronic devices are required to support standby mode, in which the electronic device is active but draws little current. Extending the standby duration (i.e., how long the electronic device can stay in the standby mode) as much as possible is critical.

A switching converter can convert an input voltage into an output voltage to power the aforementioned electronic devices. When an electronic device is in the standby mode, the device draws little power, and the switching converter operates in a light load mode. Therefore, in order to extend the standby duration, it's vital to improve the light load efficiency of the switching converter.

SUMMARY OF THE INVENTION

An embodiment of the present invention discloses a controller for a switching converter converting an alternating current (AC) input voltage into an output voltage. The controller includes a light load determining circuit, a voltage comparing circuit, a window generator and a switch control circuit. The light load determining circuit is configured to generate a light load determining signal indicating whether the switching converter operates in a light load mode. The voltage comparing circuit is configured to receive a first feedback voltage signal indicative of the output voltage and to compare the first feedback voltage signal with a first reference voltage signal and a second reference voltage signal respectively to generate a first square wave signal. The window generator is configured to receive a second feedback voltage signal indicative of the AC input voltage and to generate a second square wave signal based on the second feedback voltage signal. The switch control circuit is configured to generate a switch control signal to control the power operation of the switching converter based on the light load determining signal, the first square wave signal and the second square wave signal.

An embodiment of the present invention discloses a switching converter. The switching converter includes a switching circuit, a light load determining circuit, a voltage comparing circuit, a window generator and a switch control circuit. The switching circuit is configured to convert an AC input voltage into an output voltage. The light load determining circuit is configured to generate a light load determining signal indicating whether the switching converter operates in a light load mode. The voltage comparing circuit is configured to receive a first feedback voltage signal indicative of the output voltage and to compare the first feedback voltage signal with a first reference voltage signal and a second reference voltage signal respectively to generate a first square wave signal. The window generator is configured to receive a second feedback voltage signal indicative of the AC input voltage and to generate a second square wave signal based on the second feedback voltage signal. The switch control circuit is configured to generate a switch control signal to control the power operation of the switching converter based on the light load determining signal, the first square wave signal and the second square wave signal.

An embodiment of the present invention discloses a control method for a switching converter converting an AC input voltage into an output voltage. The control method includes the following steps. 1) Detecting whether the switching converter operates in a light load mode. 2) Determining a first time duration and a second time duration by comparing a first feedback voltage signal indicative of the output voltage with a first reference voltage signal and a second reference voltage signal respectively. 3) Detecting a zero crossing point of the AC input voltage based on a second feedback voltage signal indicative of the AC input voltage. And 4) generating a switch control signal to control the power operation of the switching converter, where when the switching converter operates in the light load mode and during the first time duration, the switch control signal is disabled in a third time duration around the zero crossing point of the AC input voltage and is enabled beyond the third time duration.

BRIEF DESCRIPTION OF DRAWINGS

The present invention can be further understood with reference to the following detailed description and the appended drawings, wherein like elements are provided with like reference numerals.

FIG. 9 illustrates a flowchart of a control method 900 used in a switching converter in accordance with an embodiment of the preset invention.

DETAILED DESCRIPTION OF THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

Reference to "one embodiment", "an embodiment", "an example" or "examples" means: certain features, structures, or characteristics are contained in at least one embodiment of the present invention. These "one embodiment", "an embodiment", "an example" and "examples" are not necessarily directed to the same embodiment or example. Furthermore, the features, structures, or characteristics may be combined in one or more embodiments or examples. In addition, it should be noted that the drawings are provided for illustration and are not necessarily to scale. And when an element is described as "connected" or "coupled" to another element, it can be directly connected or coupled to the other element, or there could exist one or more intermediate elements. In contrast, when an element is referred to as "directly connected" or "directly coupled" to another element, there is no intermediate element.

Figure 1:
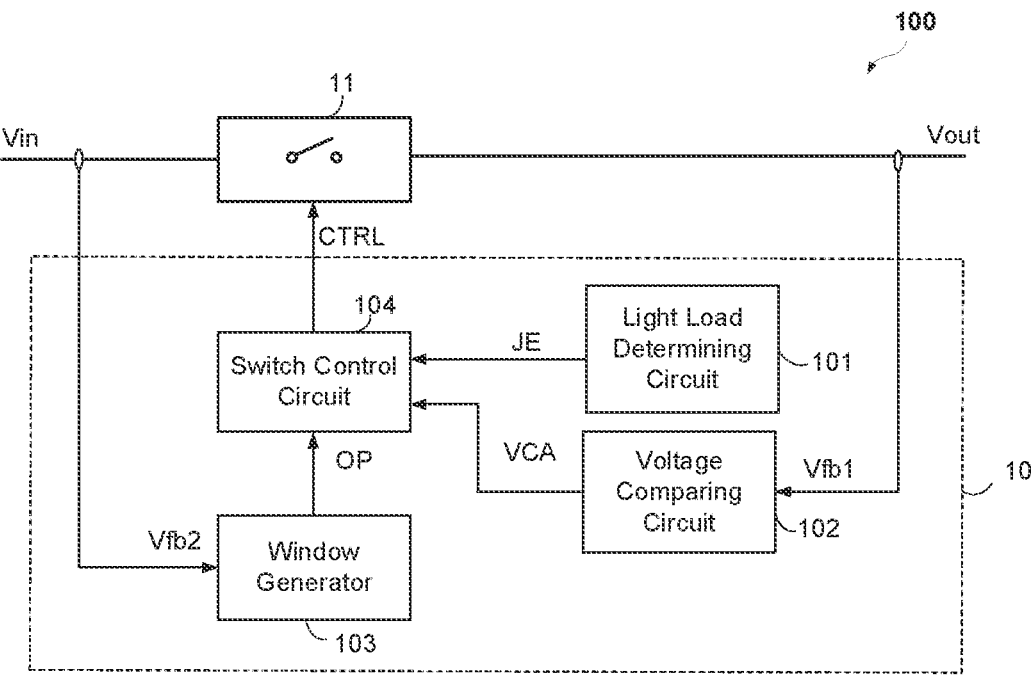
FIG. 1 illustrates a block diagram of a switching converter 100 in accordance with an embodiment of the present invention.

FIG. 1 illustrates a block diagram of a switching converter 100 in accordance with an embodiment of the present invention. The switching converter 100 includes a control circuit 10 and a switching circuit 11, where the switching circuit 11 has a power switch. The control circuit 10 is configured to generate a switch control signal CTRL to control the turning-on and the turning-off of the power switch, thereby converting an alternating current (AC) input voltage Vin into an output voltage Vout to power a load (not shown). In one embodiment, the control circuit 10 is integrated in a single integrated circuit (IC).

The control circuit 10 includes a light load determining circuit 101, a voltage comparing circuit 102, a window generator 103 and a switch control circuit 104.

In the embodiments of the present invention, the switching converter 100 operates in a light load mode when the load is light and operates in a normal mode when the load is normal. The light load determining circuit 101 is configured to detect the load state and to generate a light load determining signal JE indicating whether the switching converter 100 operates in the light load mode. In one embodiment, the light load determining circuit 101 is configured to detect the output voltage Vout and to determine whether the switching converter 100 operates in the light load mode based on an error amplifying signal between a reference voltage and the output voltage Vout or based on an error amplifying signal between a reference voltage and a dividing voltage of the output voltage Vout. In other embodiments, the light load determining circuit 101 determines whether the switching converter 100 operates in the light load mode by detecting an output current or an output power. Those skilled in the art can understand that the light load determining circuit 101 can also detect the load state based on other parameters related to the load without departing from the spirit and the scope of the invention.

In the embodiments of the present invention, the aforementioned light load and normal load can be determined based on practical applications. In one embodiment, those skilled in the art can set a load threshold, and define the load is normal when the load is higher than the load threshold and define the load is light when the load is lower than the load threshold.

The voltage comparing circuit 102 is configured to receive a first feedback voltage signal Vfb1 indicative of the output voltage Vout and to compare the first feedback voltage signal Vfb1 with a first reference voltage signal Vref1 and a second reference voltage signal Vref2 respectively to generate a first square wave signal VCA. In one embodiment, the first square wave signal VCA is switched from a first level to a second level in response to the first feedback voltage signal Vfb1 increasing to the first reference voltage signal Vref1 and is switched from the second level to the first level in response to the first feedback voltage signal Vfb1 decreasing to the second reference voltage signal Vref2.

The window generator 103 is configured to receive a second feedback voltage signal Vfb2 indicative of the AC input voltage Vin and to generate a second square wave signal OP based on the second feedback voltage signal Vfb2. In one embodiment, the second square wave signal OP is in a first level when the AC input voltage Vin is away from a zero crossing point and is in a second level when the AC input voltage Vin is close to the zero crossing point. In one embodiment, the window generator 103 detects the zero crossing point based on the second feedback voltage signal Vfb2 and generates the second square wave signal OP based on the detected zero crossing point. In a further embodiment, the window generator 103 switches the second square wave signal OP between the first level and the second level in response to a first time delay td1 and a second time delay td2 elapsing after the zero crossing point is detected, where the first time delay td1 is smaller than the second time delay td2. For example, the window generator 103 detects the zero crossing point of the AC input voltage Vin based on the second feedback voltage signal Vfb2, switches the second square wave signal OP from the second level to the first level in response to the first time delay td1 elapsing after the zero crossing point is detected and switches the second square wave signal OP from the first level to the second level in response to the second time delay td2 elapsing after the zero crossing point is detected. In another embodiment, the window generator 103 compares the second feedback voltage signal Vfb2 with a threshold voltage Vth. The second square wave signal OP is in the second level in response to the second feedback voltage signal Vfb2 being lower than the threshold voltage Vth and is in the first level in response to the second feedback voltage signal Vfb2 being higher than the threshold voltage Vth.

The switch control circuit 104 is configured to receive the light load determining signal JE, the first square wave signal VCA and the second square wave signal OP and to generate the switch control signal CTRL to control the power operation of the switching converter 100 based on the light load determining signal JE, the first square wave signal VCA and the second square wave signal OP.

In one embodiment, when the switching converter 100 operates in the light load mode and the first square wave signal VCA is in the first level, the switching converter 100 is controlled to perform power operation during the first level of the second square wave signal OP and to stop power operation during the second level of the second square wave signal OP.

In another embodiment, when the switching converter 100 operates in the light load mode and the first square wave signal VCA is in the second level, the switching converter 100 is controlled to stop power operation.

In the embodiments of the present invention, the switching converter 100 performs power operation means that the power switch of the switching converter 100 performs switching so that energy can be transmitted from an input terminal of the switching converter 100 to an output terminal of the switching converter 100, in other words, energy can be transmitted from the AC input voltage Vin to the output voltage Vout; the switching converter 100 stops power operation means that the power switch of the switching converter 100 stops switching so that the energy transmission from the input terminal to the output terminal stops.

Figure 2:
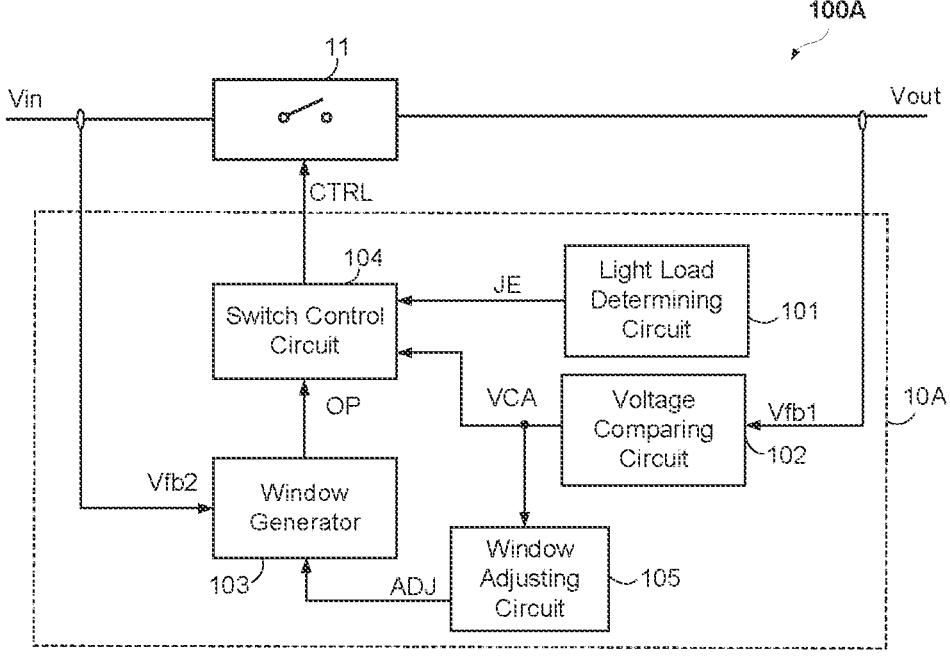
FIG. 2 illustrates a block diagram of a switching converter 100A in accordance with another embodiment of the present invention.

FIG. 2 illustrates a block diagram of a switching converter 100A in accordance with another embodiment of the present invention. The difference compared with the switching converter 100 shown in FIG. 1 is that the switching converter 100A further includes a window adjusting circuit 105. As shown in FIG. 2, the window adjusting circuit 105 is coupled to the voltage comparing circuit 102 to receive the first square wave signal VCA and is configured to generate an adjusting signal ADJ based on the first square wave signal VCA. The window generator 103 is configured to receive the adjusting signal ADJ and to adjust the second square wave signal OP. In one embodiment, the window adjusting circuit 105 is configured to compare a duty cycle D_vca of the first square wave signal VCA with a target duty cycle D_tar and to generate the adjusting signal ADJ based on the comparison result. The duty cycle D_vca=th/(th+tl), where th is the first level duration of the first square wave signal VCA and tl is the second level duration of the first square wave signal VCA. In one embodiment, the window generator 203 is configured to decrease the first level duration of the second square wave signal OP in response to the duty cycle D_vca being smaller than the target duty cycle D_tar and to increase the first level duration of the second square wave signal OP in response to the duty cycle D_vca being larger than the target duty cycle D_tar. In another embodiment, the window generator 203 is configured to increase the second level duration of the second square wave signal OP in response to the duty cycle D_vca being smaller than the target duty cycle D_tar and to decrease the second level duration of the second square wave signal OP in response to the duty cycle D_vca being larger than the target duty cycle D_tar.

Figure 3:
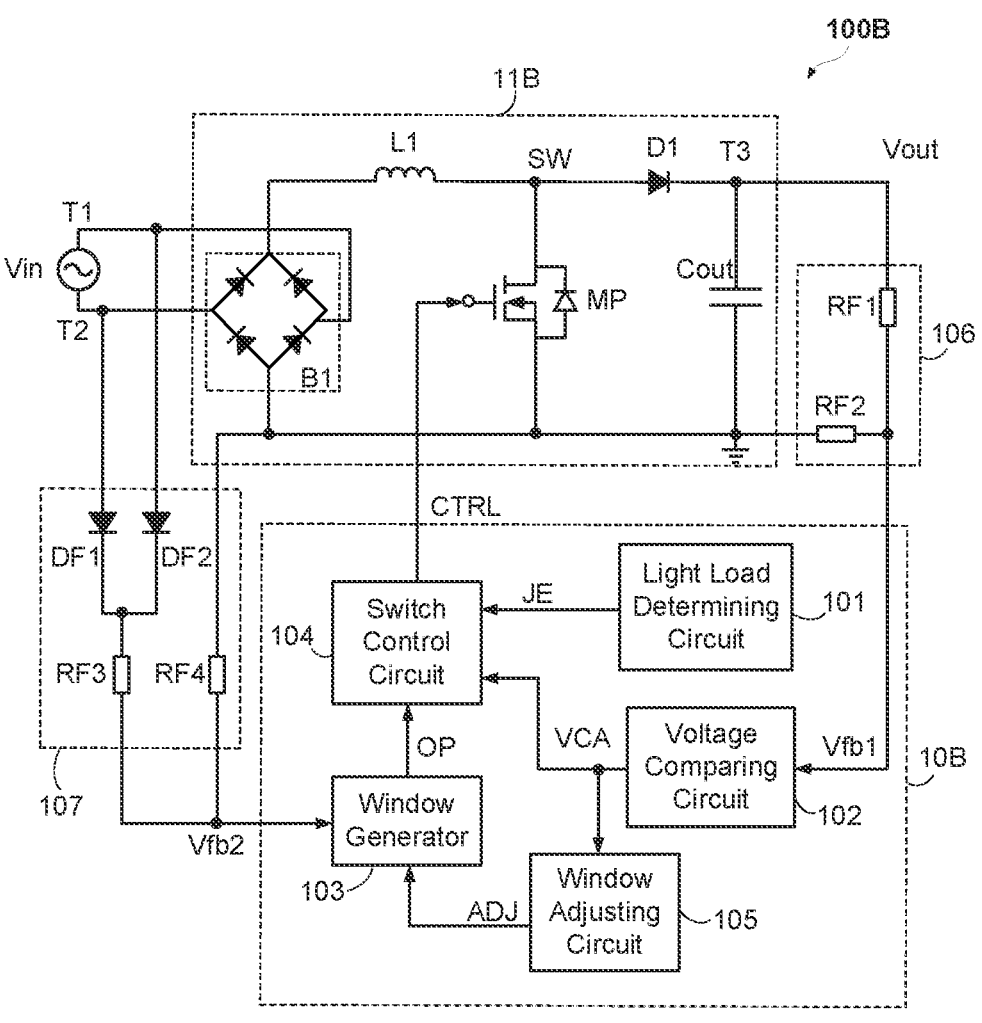
FIG. 3 illustrates a circuit schematic of a switching converter 100B in accordance with an embodiment of the present invention.

FIG. 3 illustrates a circuit schematic of a switching converter 100B in accordance with an embodiment of the present invention. As shown in FIG. 3, the switching converter 100B includes a control circuit 10B and a switching circuit 11B. The switching circuit 11B includes a rectifying circuit B1, an inductor L1, a power switch MP, a diode D1 and an output capacitor Cout. The rectifying circuit B1 is coupled between a first input node T1 and a second input node T2. The inductor L1 is coupled between the rectifying circuit B1 and a switching node SW. The power switch MP is coupled between the switching node SW and a reference ground. The diode D1 is coupled between the switching node SW and an output node T3. The output capacitor Cout is coupled between the output node T3 and the reference ground. The control circuit 10B is configured to generate a switch control signal CTRL to control the power switch MP. Those skilled in the art can understand that the power switch in the embodiments of the present invention can be any controllable semiconductor device, such as BJT, JFET, MOSFET, IGBT and so on. The diode D1 in the example shown in FIG. 3 can also be a switch.

In one embodiment, the switching converter 100B stops power operation means that the power switch MP stops switching (e.g., the power switch MP keeps OFF); the switching converter 100B performs power operation means that the power switch MP performs switching (e.g., the power switch MP switches between ON and OFF).

The switching converter 100B further includes a first feedback circuit 106 and a second feedback circuit 107. The first feedback circuit 106 is configured to receive the output voltage Vout and to generate the first feedback voltage signal Vfb1 indicative of the output voltage Vout. In the example shown in FIG. 3, the first feedback circuit 106 includes resistors RF1 and RF2 coupled in series, where a common connection node of the resistors RF1 and RF2 provides the first feedback voltage signal Vfb1.

The second feedback circuit 107 is configured to receive the AC input voltage Vin and to generate the second feedback voltage signal Vfb2 indicative of the AC input voltage Vin. In the example shown in FIG.3, the second feedback circuit 107 includes diodes DF1, DF2 and resistors RF3, RF4. A common connection node of the resistors RF3 and RF4 provides the second feedback voltage signal Vfb2, where Vfb2=k*|Vin|, k is a proportional coefficient.

Figure 4:
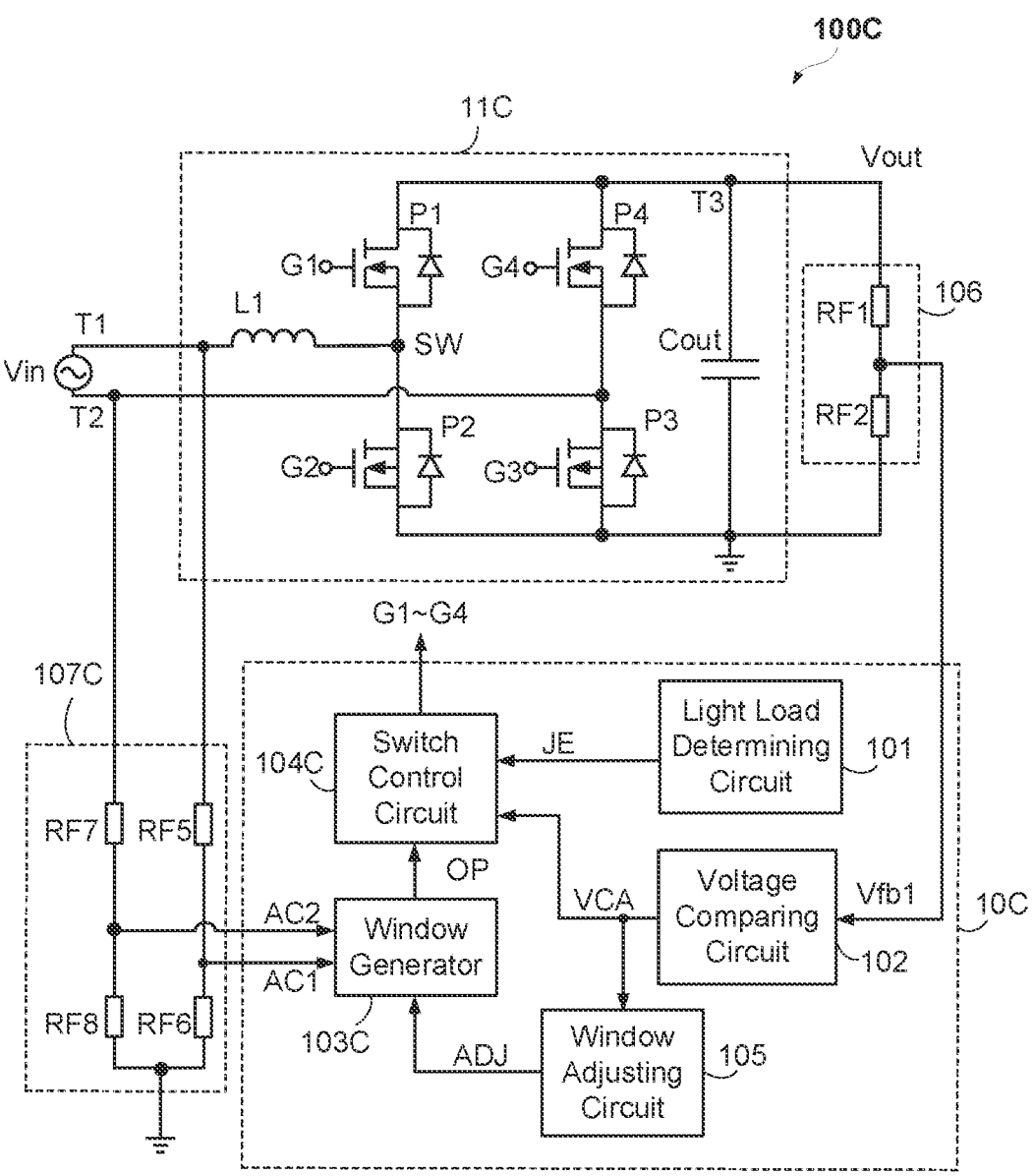
FIG. 4 illustrates a circuit schematic of a switching converter 100C in accordance with another embodiment of the present invention.

FIG. 4 illustrates a circuit schematic of a switching converter 100C in accordance with another embodiment of the present invention. As shown in FIG. 4, the switching converter 100C includes a control circuit 10C and a switching circuit 11C. The switching circuit 11C includes an inductor L1, power switches P1~P4 and an output capacitor Cout. The inductor L1 is coupled between a first input node T1 and a switching node SW. The first power switch P1 is coupled between an output node T3 and the switching node SW. The second power switch P2 is coupled between the switching node SW and a reference ground. The third power switch P3 is coupled between a second input node T2 and the reference ground. The fourth power switch P4 is coupled between the output node T3 and the second input node T2. The output capacitor Cout is coupled between the output node T3 and the reference ground. The control circuit 10C is configured to generate switch control signals G1~G4 to control the power switches P1~P4 respectively. Those skilled in the art can understand that the third power switch P3 and the fourth power switch P4 can also be diodes.

In one embodiment, when the AC input voltage Vin is in a positive half cycle, the third power switch P3 keeps ON, the fourth power switch P4 keeps OFF, the first power switch P1 and the second power switch P2 switch between ON and OFF. When the AC input voltage Vin is in a negative half cycle, the third power switch P3 keeps OFF, the fourth power switch P4 keeps ON, the first power switch P1 and the second power switch P2 switch between ON and OFF. The switching converter 100C performs power operation means that power switches P1~P4 perform these operations.

In one embodiment, the switching converter 100C stops power operation means that the first power switch P1 and the second power switch P2 stop switching (e.g., both the first power switch P1 and the second power switch P2 keep OFF). In another embodiment, the switching converter 100C stops power operation means that all power switches P1~P4 keep OFF.

The switching converter 100C further includes a first feedback circuit 106 and a second feedback circuit 107C. Different from FIG. 3, the second feedback voltage signal Vfb2 in the example shown in FIG. 4 includes a first voltage signal AC1 and a second voltage signal AC2. As shown in FIG. 4, the second feedback circuit 107C includes resistors RF5~RF8, where a common connection node of the resistors RF5 and RF6 provides the first voltage signal AC1, and a common connection node of the resistors RF7 and RF8 provides the second voltage signal AC2.

The window generator 103C is configured to generate the second square wave signal OP based on the first voltage signal AC1 and the second voltage signal AC2. In one embodiment, the window generator 103C is configured to compare the first voltage signal AC1 with the second voltage signal AC2 to detect the zero crossing point of the AC input voltage Vin. It is considered that the zero crossing point of the AC input voltage Vin has been detected when the first voltage signal AC1 is equal to the second voltage signal AC2. The window generator 103C switches the second square wave signal OP from the second level to the first level in response to the first time delay td1 elapsing after the zero crossing point is detected and switches the second square wave signal OP from the first level to the second level in response to the second time delay td2 elapsing after the zero crossing point is detected, where the first time delay td1 is smaller than the second time delay td2.

Those skilled in the art can understand that the examples shown in FIG. 3 and FIG. 4 are exemplary illustrations, other suitable circuits are also applicable. In other embodiments, the first feedback circuit 106 and the second feedback circuit 107 can be omitted, then the first feedback voltage signal Vfb1 is the output voltage Vout itself and the second feedback voltage signal Vfb2 is the AC input voltage Vin itself.

Figure 5:
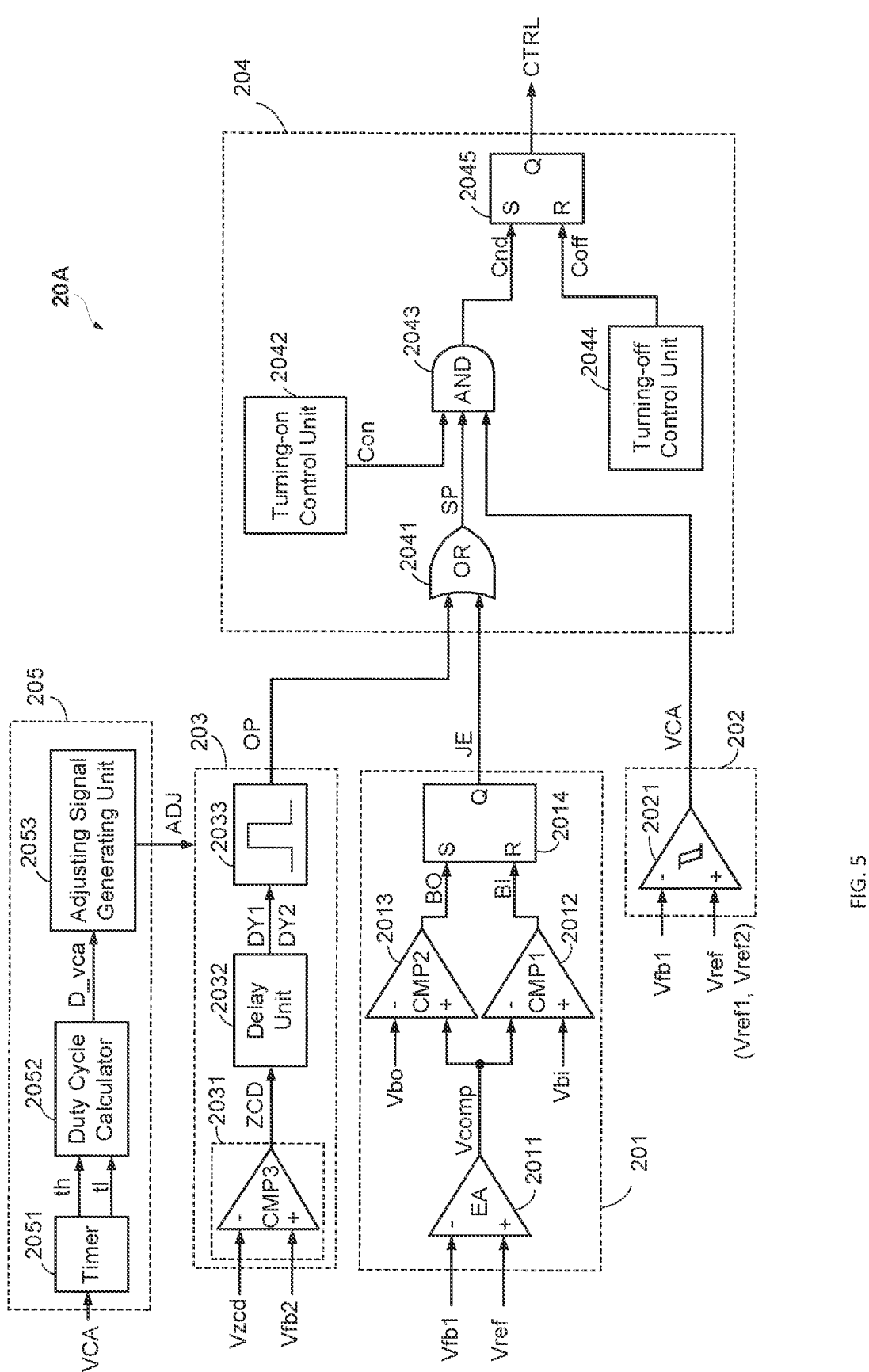
FIG. 5 illustrates a circuit schematic of a control circuit 20A used in the switching converter 100A shown in FIG. 2 in accordance with an embodiment of the present invention.

FIG. 5 illustrates a circuit schematic of a control circuit 20A used in the switching converter 100A shown in FIG. 2 in accordance with an embodiment of the present invention. As shown in FIG. 5, the control circuit 20A includes a light load determining circuit 201, a voltage comparing circuit 202, a window generator 203, a switch control circuit 204 and a window adjusting circuit 205.

In the example shown in FIG. 5, the light load determining circuit 201 includes an error amplifier 2011, a first comparator 2012, a second comparator 2013 and a RS flip-flop 2014. The error amplifier 2011 receives the first feedback voltage signal Vfb1 and a reference voltage signal Vref and generates a compensating signal Vcomp based on the difference between the reference voltage signal Vref and the first feedback voltage signal Vfb1. The first comparator 2012 compares the compensating signal Vcomp with an enter-light-load-mode threshold Vbi and generates an enter-light-load-mode setting signal BI based on the comparison result. The second comparator 2013 compares the compensating signal Vcomp with an exit-light-load-mode threshold Vbo and generates an exit-light-load-mode setting signal BO based on the comparison result. The RS flip-flop 2014 has a set terminal S, a reset terminal R and an output terminal Q, where the set terminal S receives the exit-light-load-mode setting signal BO, the reset terminal R receives the enter-light-load-mode setting signal BI. Based on the exit-light-load-mode setting signal BO and the enter-light-load-mode setting signal BI, the RS flip-flop 2014 generates the light load determining signal JE at the output terminal Q. In one embodiment, the first comparator 2012, the second comparator 2013 and the RS flip-flop 2014 can be replaced by a hysteresis comparator.

The voltage comparing circuit 202 includes a hysteresis comparator 2021. The hysteresis comparator 2021 receives the first feedback voltage signal Vfb1 and compares the first feedback voltage signal Vfb1 with a first reference voltage signal Vref1 and a second reference voltage signal Vref2 respectively to generate the first square wave signal VCA, where the first reference voltage signal Vref1 is a high threshold voltage of the hysteresis comparator 2021 and the second reference voltage signal Vref2 is a low threshold voltage of the hysteresis comparator 2021. In one embodiment, the second reference voltage signal Vref2=Vref, the first reference voltage signal Vref1=Vref+Vhys, where Vhys is a hysteresis voltage of the hysteresis comparator 2021. In one embodiment, the first square wave signal VCA is switched from the first level (e.g., logic high) to the second level (e.g., logic low) in response to the first feedback voltage signal Vfb1 increasing to the first reference voltage signal Vref1 and is switched from the second level to the first level in response to the first feedback voltage signal Vfb1 decreasing to the second reference voltage signal Vref2.

The window generator 203 includes a zero crossing comparator 2031, a delay unit 2032 and a window signal generating unit 2033. The zero crossing comparator 2031 receives the second feedback voltage signal Vfb2 and compares the second feedback voltage signal Vfb2 with a zero voltage signal Vzcd to generate a zero crossing detecting signal ZCD. Those skilled in the art can understand that, when the second feedback voltage signal Vfb2 includes the first voltage signal AC1 and the second voltage signal AC2 (as shown in FIG. 4), the zero crossing comparator 2031 can compare the first voltage signal AC1 with the second voltage signal AC2 to generate the zero crossing detecting signal ZCD and can also compare a differential signal with the zero voltage signal Vzcd to generate the zero crossing detecting signal ZCD, where the differential signal indicates the absolute value of the difference between the first voltage signal AC1 and the second voltage signal AC2.

The delay unit 2032 generates a first delay pulse DY1 in response to the first time delay td1 elapsing after the zero crossing point is detected. The window signal generating unit 2033 is triggered by the first pulse DY1 and switches the second square wave signal OP from the second level (e.g., logic low) to the first level (e.g., logic high). The delay unit 2032 generates a second delay pulse DY2 in response to the second time delay td2 elapsing after the zero crossing point is detected. The window signal generating unit 2033 is triggered by the second delay pulse DY2 and switches the second square wave signal OP from the first level to the second level. In the embodiments of the present application, we record the first level duration of the second square wave signal OP as tw, then tw=td2−td1.

The switch control circuit 204 includes an OR gate 2041, a turning-on control unit 2042, an AND gate 2043, a turning-off control unit 2044 and a RS flip-flop 2045. The OR gate 2041 receives the light load determining signal JE and the second square wave signal OP and generates an OR signal SP. The turning-on control unit 2042 generates a turning-on control signal Con to control the turning-on of the power switch. In one embodiment, when a current flowing through an inductor of the switching converter 100A decreases to a current threshold, the turning-on control signal Con is switched from logic low to logic high. The AND gate 2043 receives the turning-on control signal Con, the OR signal SP and the first square wave signal VCA and generates an AND signal Cnd. The turning-off control unit 2044 generates a turning-off control signal Coff to control the turning-off of the power switch. In one embodiment, when an ON time of the power switch reaches a time threshold, the turning-off control signal Coff is switched from logic low to logic high. The RS flip-flop 2045 has a set terminal S, a reset terminal R and an output terminal Q, where the set terminal S receives the AND signal Cnd, the reset terminal R receives the turning-off control signal Coff. Based on the AND signal Cnd and the turning-off control signal Coff, the RS flip-flop 2045 generates the switch control signal CTRL at the output terminal Q.

The window adjusting circuit 205 includes a timer 2051, a duty cycle calculator 2052 and an adjusting signal generating unit 2053. The timer 2051 receives the first square wave signal VCA and detects the first level duration th of the first square wave signal VCA and the second level duration tl of the first square wave signal VCA. The duty cycle calculator 2052 receives the first level duration th and the second level duration tl and obtains the duty cycle D_vca, where D_vca=th/(th+tl). The adjusting signal generating unit 2053 receives the duty cycle D_vca and compares the duty cycle D_vca with the target duty cycle D_tar to generate the adjusting signal ADJ. In one embodiment, the target duty cycle D_tar can be preset and stored in a register.

In the example shown in FIG. 5, the window generator 203 receives the adjusting signal ADJ and adjusts the first level duration tw of the second square wave signal OP based on the adjusting signal ADJ. The window generator 203 decreases the duration tw in response to the duty cycle D_vca being smaller than the target duty cycle D_tar and increases the duration tw in response to the duty cycle D_vca being larger than the target duty cycle D_tar. In one embodiment, the window generator 203 increases/decreases the duration tw with a step size tstep. In one embodiment, the step size tstep can be preset and stored in a register. In one embodiment, the window generator 203 adjusts the duration tw by adjusting the first time delay td1 and/or the second time delay td2. For example, the window generator 203 can increase the first time delay td1 and/or decrease the second time delay td2 to decrease the duration tw and can decrease the first time delay td1 and/or increase the second time delay td2 to increase the duration tw.

Figure 6:
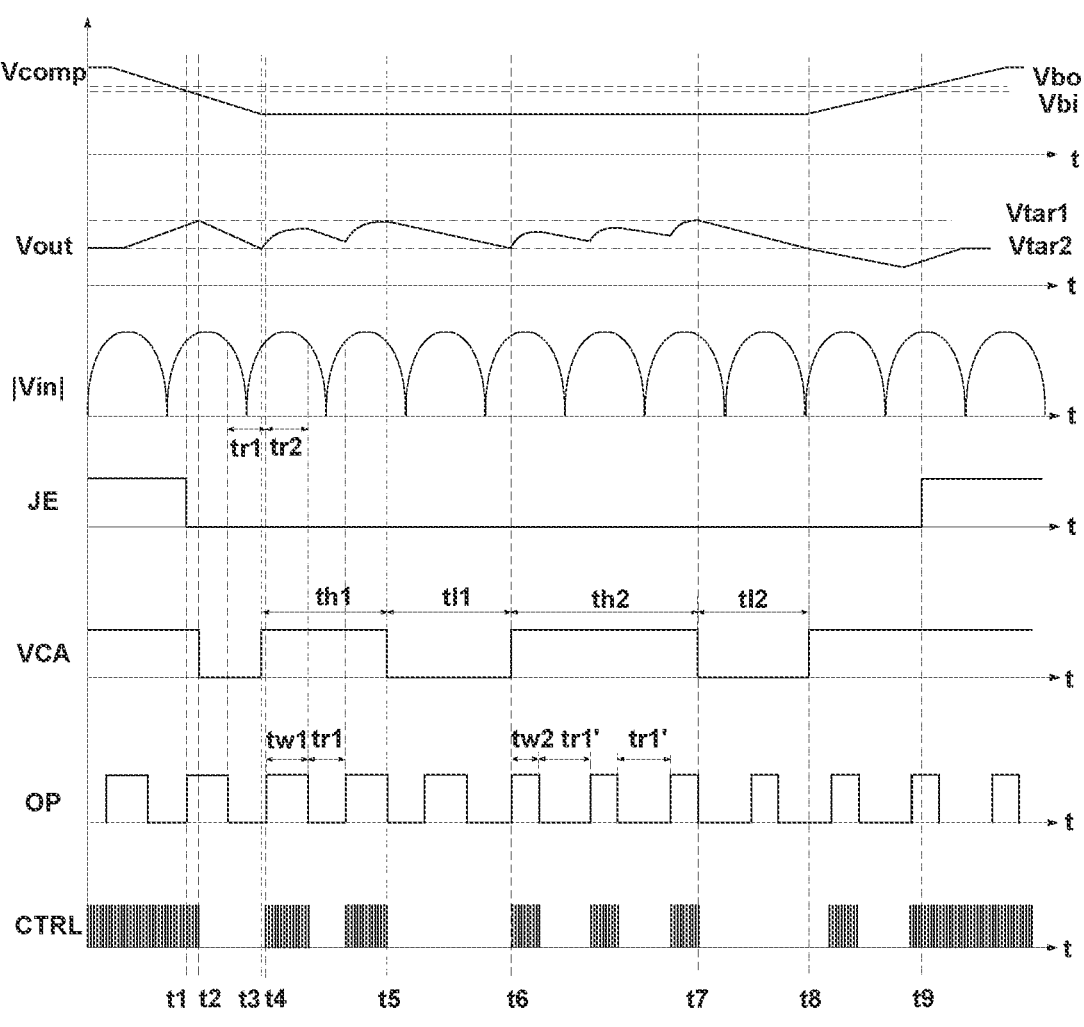
FIG. 6 illustrates working waveforms of the switching converter 100A shown in FIG. 2 in accordance with an embodiment of the present invention.

FIG. 6 illustrates working waveforms of the switching converter 100A shown in FIG. 2 in accordance with an embodiment of the present invention.

At time t1, the compensating signal Vcomp decreases to the enter-light-load-mode threshold Vbi, the switching converter 100A enters the light load mode, the light load determining signal JE is switched from the first level (e.g., logic high) to the second level (e.g., logic low).

At time t2, t5 or t7, the output voltage Vout increases to a first target voltage Vtar1 (i.e., the first feedback voltage signal Vfb1 increases to the first reference voltage signal Vref1), the first square wave signal VCA is switched from the first level (e.g., logic high) to the second level (e.g., logic low). At time t3, t6 or t8, the output voltage Vout decreases to a second target voltage Vtar2 (i.e., the first feedback voltage signal Vfb1 decreases to the second reference voltage signal Vref2), the first square wave signal VCA is switched from the second level to the first level.

When the AC input voltage Vin is close to the zero crossing point (e.g., within a time duration tr1 around the zero crossing point, as shown in FIG. 6), the second square wave signal OP is in the second level (e.g., logic low). When the AC input voltage Vin is away from the zero crossing point (e.g., within a time duration tr2, as shown in FIG. 6), the second square wave signal OP is in the first level (e.g., logic high). The time duration tr1 shown in FIG. 6 is symmetrical about the zero crossing point. In other embodiments, the time duration tr1 can also be asymmetrical about the zero crossing point.

During time t2~t8, when the first square wave signal VCA is in the first level, the switching converter 100A performs power operation during the first level of the second square wave signal OP and stops power operation during the second level of the second square wave signal OP. When the first square wave signal VCA is in the second level, the switching converter 100A stops power operation.

During time t3~t6, the first level duration of the second square wave signal OP is tw1. The duty cycle of the first square wave signal VCA is D_vca1=th1/(th1+tl1), which is smaller than the target duty cycle D_tar. The window adjusting circuit 205 generates the adjusting signal ADJ based on the comparison result between the duty cycle D_vca1 and the target duty cycle D_tar. The window generator 203 receives the adjusting signal ADJ and decreases the first level duration of the second square wave signal OP from tw1 to tw2 based on the adjusting signal ADJ. Then the duty cycle of the first square wave signal VCA increases to D_vca2=th2/(th2+tl2) during time t6~t8. By the similar way, the control circuit 10A adjusts the duty cycle of the first square wave signal VCA to be equal to the target duty cycle D_tar after one or more adjustments.

At time t9, the compensating signal Vcomp increases to the exit-light-load-mode threshold Vbo, the switching converter 100A exits the light load mode, the light load determining signal JE is switched from the second level to the first level.

As shown in FIG. 6, when the switching converter 100A operates in the light load mode (e.g., time t1~t9), a first time duration (e.g., th1 and th2) and a second time duration (e.g., tl1 and tl2) are determined based on the comparison between the output voltage Vout with the first target voltage Vtar1 and the second target voltage Vtar2 (or based on the comparison between the first feedback voltage signal Vfb1 with the first reference voltage signal Vref1 and the second reference voltage signal Vref2). During the first time duration, if a zero crossing point of the AC input voltage Vin is detected, the switch control signal CTRL is disabled in a third time duration around the zero crossing point (e.g., tr1 and tr1'). During the second time duration, the switch control signal CTRL is disabled.

According to the embodiments of the present invention, when the switching converter 100A operates in the light load mode, the switching converter 100A only performs power operation when the output voltage Vout decreases to the second target voltage Vtar2 and the absolute value of the AC input voltage Vin is high enough. The switching converter 100A stops power operation near the zero crossing point of the AC input voltage Vin. This can reduce the switching loss and improve the light load efficiency.

Figure 7A:
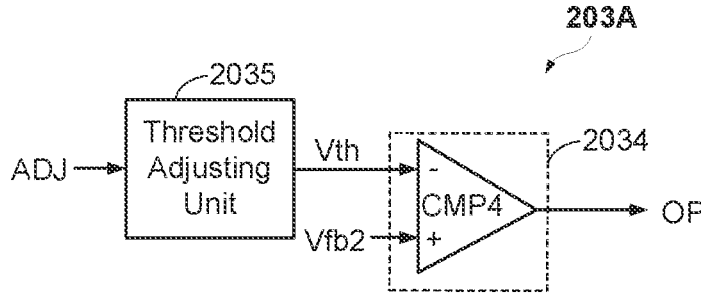
FIG. 7A illustrates a circuit schematic of a window generator 203A used in the switching converter 100A shown in FIG. 2 in accordance with another embodiment of the present invention.
Figure 7B:
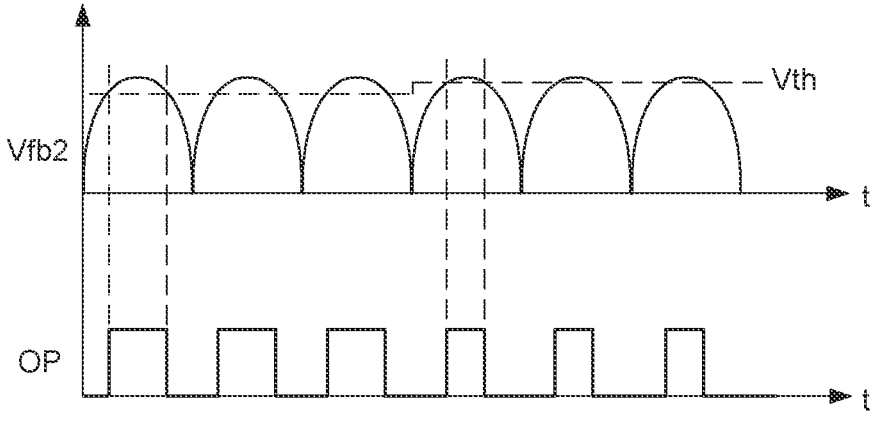
FIG. 7B illustrates working waveforms of the window generator 203A in accordance with an embodiment of the present invention.

FIG. 7A illustrates a circuit schematic of a window generator 203A used in the switching converter 100A shown in FIG. 2 in accordance with another embodiment of the present invention. FIG. 7B illustrates working waveforms of the window generator 203A in accordance with an embodiment of the present invention. As shown in FIG. 7A, the window generator 203A includes a comparator 2034. The comparator 2034 receives the second feedback voltage signal Vfb2 and compares the second feedback voltage signal Vfb2 with the threshold voltage Vth to generate the second square wave signal OP. As shown in FIG. 7B, when the second feedback voltage signal Vfb2 is lower than the threshold voltage Vth, the second square wave signal OP is in the second level (e.g., logic low); when the second feedback voltage signal Vfb2 is higher than the threshold voltage Vth, the second square wave signal OP is in the first level (e.g., logic high).

In the example shown in FIG. 7A, the window generator 203A further includes a threshold adjusting unit 2035. The threshold adjusting unit 2035 is coupled to the window adjusting circuit 205 to receive the adjusting signal ADJ and adjusts the threshold voltage Vth based on the adjusting signal ADJ, thereby adjusting the first level duration of the second square wave signal OP. In one embodiment, when the duty cycle D_vca is smaller than the target duty cycle D_tar, the threshold adjusting unit 2035 increases the threshold voltage Vth to decrease the first level duration of the second square wave signal OP; when the duty cycle D_vca is larger than the target duty cycle D_tar, the threshold adjusting unit 2035 decreases the threshold voltage Vth to increase the first level duration of the second square wave signal OP.

Figure 8:
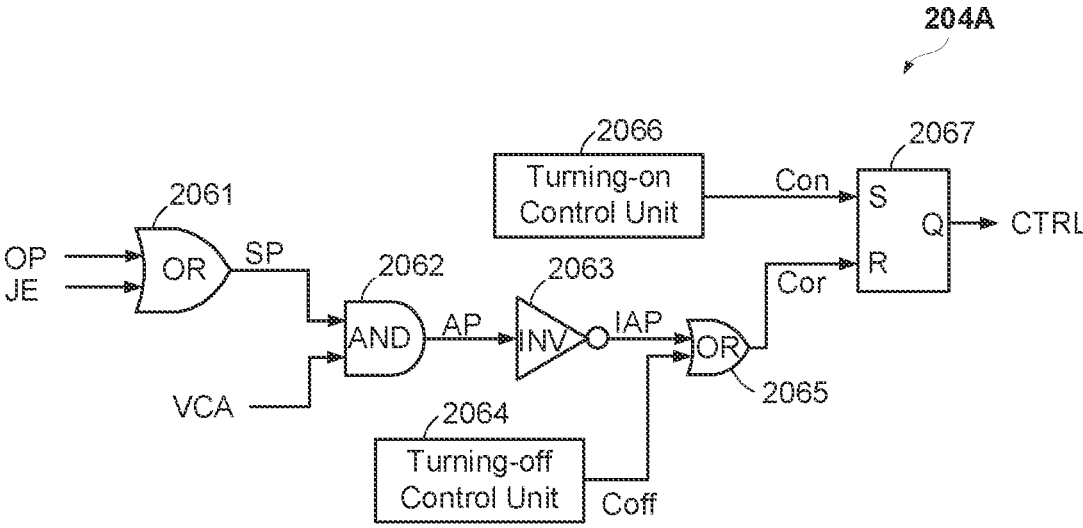
FIG. 8 illustrates a circuit schematic of a switch control circuit 204A used in the switching converter 100A shown in FIG. 2 in accordance with another embodiment of the present invention.

FIG. 8 illustrates a circuit schematic of a switch control circuit 204A used in the switching converter 100A shown in FIG. 2 in accordance with another embodiment of the present invention. The switch control circuit 204A includes an OR gate 2061, an AND gate 2062, an inverter 2063, a turning-off control unit 2064, an OR gate 2065, a turning-on control unit 2066 and a RS flip-flop 2067. The OR gate 2061 receives the light load determining signal JE and the second square wave signal OP and generates an OR signal SP. The AND gate 2062 receives the OR signal SP and the first square wave signal VCA and generates an AND signal AP. The inverter 2063 inverts the AND signal AP to generate an inverting AND signal IAP. The turning-off control unit 2064 generates a turning-off control signal Coff to control the turning-off of the power switch. The OR gate 2065 receives the inverting AND signal IAP and the turning-off control signal Coff and generates an OR control signal Cor. The turning-on control unit 2066 generates a turning-on control signal Con to control the turning-on of the power switch. The RS flip-flop 2067 has a set terminal S, a reset terminal R and an output terminal Q, where the set terminal S receives the turning-on control signal Con, the reset terminal R receives the OR control signal Cor. Based on the turning-on control signal Con and the OR control signal Cor, the RS flip-flop 2067 generates the switch control signal CTRL at the output terminal Q.

Those skilled in the art can understand that, when the input polarity of comparators changes, the logic high/logic low of the corresponding output signal also changes, and then the control logic needs to be adjusted accordingly. The examples shown above are used for illustrative purposes, not used for limiting the present invention. Other suitable circuits can also be applicable here. In other embodiments, the working principle of the control circuit can be described by digital language such as VHDL, Verilog, thereby generating digital circuits to realize the functions of the control circuit.

FIG. 9 illustrates a flowchart of a control method 900 used in a switching converter in accordance with an embodiment of the preset invention. The switching converter converts an AC input voltage into an output voltage. The control method 900 includes steps S901~S904.

At step S901, a light load determining signal indicating whether the switching converter operates in a light load mode is generated.

At step S902, a first square wave signal is generated by comparing a first feedback voltage signal indicative of the output voltage with a first reference voltage signal and a second reference voltage signal respectively. In one embodiment, the first square wave signal is switched from a first level to a second level in response to the first feedback voltage signal increasing to the first reference voltage signal and is switched from the second level to the first level in response to the first feedback voltage signal decreasing to the second reference voltage signal. In one embodiment, the first level is logic high, the second level is logic low.

At step S903, a second square wave signal is generated based on a second feedback voltage signal indicative of the AC input voltage. In one embodiment, the second square wave signal is in the second level when the AC input voltage is close to a zero crossing point, otherwise, the second square wave signal is in the first level. In one embodiment, the first level is logic high, the second level is logic low.

At step S904, a switch control signal is generated to control the power operation of the switching converter based on the light load determining signal, the first square wave signal and the second square wave signal. When the switching converter operates in the light load mode and the first square wave signal is in the first level, the switching converter performs power operation during the first level of the second square wave signal and stops power operation during the second level of the second square wave signal.

In one embodiment, the control method 900 further includes: an adjusting signal is generated by comparing a duty cycle of the first square wave signal with a target duty cycle; and the first level duration of the second square wave signal is adjusted based on the adjusting signal.

In one embodiment, the first level duration of the second square wave signal is decreased in response to the duty cycle of the first square wave signal being smaller than the target duty cycle and is increased in response to the duty cycle of the first square wave signal being larger than the target duty cycle.

In one embodiment, a control method used in a switching converter converting an AC input voltage into an output voltage includes following steps. 1) Whether the switching converter operates in a light load mode is detected. 2) A first time duration and a second time duration are determined by comparing a first feedback voltage signal indicative of the output voltage with a first reference voltage signal and a second reference voltage signal respectively. 3) A zero crossing point of the AC input voltage is detected based on a second feedback voltage signal indicative of the AC input voltage. And 4) a switch control signal is generated based on the first and second feedback voltage signals to control the power operation of the switching converter. When the switching converter operates in the light load mode, the switch control signal is enabled (thus the switching converter performs power operation) during the first time duration and the switch control signal is disabled (thus the switching converter stops power operation) during the second time duration. In some of the embodiments, if a zero crossing point of the AC input voltage is detected within the first time duration, the switch control signal is further disabled (thus the switching converter stops power operation) in a third time duration around the zero crossing point.

Those skilled in the art can understand that, in the flowchart described above, the steps may also be performed in an order different from the order shown as FIG. 9. For example, two successive steps may be performed meanwhile, or may be performed in a reverse order sometimes, it depends to the specific function involved.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Obviously, many modifications and variations of the present invention are possible in light of the above teachings. It is therefore to be understood that within the scope of the appended claims the invention may be practiced otherwise than as specifically described. It should be understood, of course, the foregoing disclosure relates only to a preferred embodiment (or embodiments) of the invention and that numerous modifications may be made therein without departing from the spirit and the scope of the invention as set forth in the appended claims. Various modifications are contemplated and they obviously will be resorted to by those skilled in the art without departing from the spirit and the scope of the invention as hereinafter defined by the appended claims as only a preferred embodiment(s) thereof has been disclosed.

What is claimed is:

1. A controller for a switching converter converting an alternating current (AC) input voltage into an output voltage, the controller comprising:

a light load determining circuit configured to generate a light load determining signal indicating whether the switching converter operates in a light load mode;

a voltage comparing circuit configured to receive a first feedback voltage signal indicative of the output voltage and to compare the first feedback voltage signal with a first reference voltage signal and a second reference voltage signal respectively to generate a first square wave signal;

a window generator configured to receive a second feedback voltage signal indicative of the AC input voltage and to generate a second square wave signal based on the second feedback voltage signal; and a switch control circuit configured to generate a switch control signal to control the power operation of the switching converter based on the light load determining signal, the first square wave signal and the second square wave signal.

2. The controller of claim 1, further comprising:

a window adjusting circuit configured to compare a duty cycle of the first square wave signal with a target duty cycle and to generate an adjusting signal to adjust the second square wave signal based on the comparison result.

3. The controller of claim 2, wherein:

a level duration of the second square wave signal is decreased in response to the duty cycle of the first square wave signal being smaller than the target duty cycle; and wherein the level duration of the second square wave signal is increased in response to the duty cycle of the first square wave signal being larger than the target duty cycle.

4. The controller of claim 1, wherein the window generator is configured to detect a zero crossing point of the AC input voltage based on the second feedback voltage signal and to generate the second square wave signal in accordance with the detected zero crossing point.

5. The controller of claim 4, wherein the window generator is further configured to switch the second square wave signal between a first level and a second level in response to a first time delay and a second time delay elapsing after the zero crossing point is detected, wherein the first time delay is smaller than the second time delay.

6. The controller of claim 1, wherein the window generator is configured to compare the second feedback voltage signal with a threshold voltage to generate the second square wave signal.

7. The controller of claim 1, wherein when the switching converter operates in the light load mode and the first square wave signal is in a first level, the switching converter is controlled to stop power operation in a time duration around a zero crossing point of the AC input voltage and to perform power operation beyond the time duration.

8. The controller of claim 7, wherein when the switching converter operates in the light load mode and the first square wave signal is in a second level, the switching converter is controlled to stop power operation.

9. A switching converter comprising:

a switching circuit configured to convert an AC input voltage into an output voltage;

a light load determining circuit configured to generate a light load determining signal indicating whether the switching converter operates in a light load mode;

a voltage comparing circuit configured to receive a first feedback voltage signal indicative of the output voltage and to compare the first feedback voltage signal with a first reference voltage signal and a second reference voltage signal respectively to generate a first square wave signal;

a window generator configured to receive a second feedback voltage signal indicative of the AC input voltage and to generate a second square wave signal based on the second feedback voltage signal; and a switch control circuit configured to generate a switch control signal to control the power operation of the switching converter based on the light load determining signal, the first square wave signal and the second square wave signal.

10. The switching converter of claim 9, further comprising:

a window adjusting circuit configured to compare a duty cycle of the first square wave signal with a target duty cycle and to generate an adjusting signal to adjust the second square wave signal based on the comparison result.

11. The switching converter of claim 10, wherein:

a level duration of the second square wave signal is decreased in response to the duty cycle of the first square wave signal being smaller than the target duty cycle; and wherein the level duration of the second square wave signal is increased in response to the duty cycle of the first square wave signal being larger than the target duty cycle.

12. The switching converter of claim 9, wherein the window generator is configured to detect a zero crossing point of the AC input voltage based on the second feedback voltage signal and to generate the second square wave signal based on the detected zero crossing point.

13. The switching converter of claim 12, wherein the window generator is further configured to switch the second square wave signal between a first level and a second level in response to a first time delay and a second time delay elapsing after the zero crossing point is detected, wherein the first time delay is smaller than the second time delay.

14. The switching converter of claim 9, wherein when the switching converter operates in the light load mode and the first square wave signal is in a first level, the switching converter is controlled to perform power operation during a first level of the second square wave signal and to stop power operation during a second level of the second square wave signal.

15. The switching converter of claim 14, wherein when the switching converter operates in the light load mode and the first square wave signal is in a second level, the switching converter is controlled to stop power operation.

16. The switching converter of claim 9, wherein the switching circuit comprises:

an inductor coupled between a first input node of the switching circuit and a switching node of the switching circuit;

a first power switch coupled between an output node of the switching circuit and the switching node;

a second power switch coupled between the switching node and a reference ground;

a third power switch coupled between a second input node of the switching circuit and the reference ground; and a fourth power switch coupled between the output node and the second input node.

17. The switching converter of claim 16, further comprising a feedback circuit, wherein the feedback circuit comprises:

a first resistor and a second resistor coupled in series between the first input node and the reference ground, wherein a common connection node of the first resistor and the second resistor provides a first voltage signal; and a third resistor and a fourth resistor coupled in series between the second input node and the reference ground, wherein a common connection node of the third resistor and the fourth resistor provides a second voltage signal; wherein the window generator is configured to generate the second square wave signal based on the first voltage signal and the second voltage signal.

18. A control method for a switching converter converting an AC input voltage into an output voltage, the control method comprising:

detecting whether the switching converter operates in a light load mode;

determining a first time duration and a second time duration by comparing a first feedback voltage signal indicative of the output voltage with a first reference voltage signal and a second reference voltage signal respectively;

detecting a zero crossing point of the AC input voltage based on a second feedback voltage signal indicative of the AC input voltage; and generating a switch control signal to control the power operation of the switching converter, wherein when the switching converter operates in the light load mode and during the first time duration, the switch control signal is disabled in a third time duration around the zero crossing point of the AC input voltage and is enabled beyond the third time duration.

19. The control method of claim 18, further comprising:

adjusting the third time duration based on a ratio of the first time duration to the second time duration.

20. The control method of claim 19, wherein:

increasing the third time duration in response to the ratio of the first time duration to the second time duration being smaller than a target value; and wherein decreasing the third time duration in response to the ratio of the first time duration to the second time duration being larger than the target value.

* * * * *